United States Patent
Oshima et al.

[11] 3,867,690
[45] Feb. 18, 1975

[54] HIGHLY DIRECTIONAL PARAMETRIC MAGNETIC SENSOR

[75] Inventors: Shintaro Oshima, Tokyo; Teruji Watanabe, Niza; Takasuke Fukui, Tokyo; Shinzuo Suzuki, Kawasaki, all of Japan

[73] Assignee: Kokusai Denshin Denwa Kabushiki Kaisha, Tokyo-to, Japan

[22] Filed: June 6, 1973

[21] Appl. No.: 367,429

[30] Foreign Application Priority Data
June 8, 1972 Japan.............................. 47-56458

[52] U.S. Cl............................... 324/43 R, 307/88 P
[51] Int. Cl............................................. G01r 33/02
[58] Field of Search ...... 324/43 R; 307/88 P, 88 TF

[56] References Cited
UNITED STATES PATENTS
3,275,839 9/1966 Bartik................. 307/88 P
3,718,872 2/1973 Takenchi.......................... 324/43 R

*Primary Examiner*—Robert J. Corcoran
*Attorney, Agent, or Firm*—Robert E. Burns; Emmanuel J. Lobato; Bruce L. Adams

[57] ABSTRACT

A highly directional magnetic sensor of the parametrical excited second harmonic oscillator type. A straight first conductor having a thin film of magnetic material disposed thereon is surrounded by an inner coil and an outer coil, each coaxial with the central longitudinal axis of the straight conductor and extending over a common portion of the straight conductor in a longitudinal direction thereof. A cylindrical second conductor having a thin film of magnetic material disposed thereon surrounds the inner coil and is insulated therefrom. A conductor connects the straight first conductor with the cylindrical second conductor to complete a series circuit path for an input exciting current. Another conductor connects the inner and outer coils in a differential series circuit. The distributed capacitance between the coils forms a resonate circuit with the coils which has an output current induced therein by the input currents. The distributed capacitance may be enhanced by including a dielectric layer adjacent the coils. The phase of the output current relative to the input current is determined by magnetic fields external to the sensor, and the relative phases of the currents are a measure of the field.

6 Claims, 7 Drawing Figures

HIGHLY DIRECTIONAL PARAMETRIC MAGNETIC SENSOR

This invention relates to a directional magnetic sensor, comprising a parametrically excited second harmonic oscillator for detecting the presence or absence and the polarity of a small external magnetic field by utilizing dependency of the oscillation phase of the oscillator upon the polarity of the external magnetic field applied thereto.

The present inventors have previously proposed magnetic sensors designed to detect magnetic flux by utilizing the parametrically excited second harmonic oscillation. (Japanese Pat. Publication No. 59224/1970; U.S. Pat. application Ser. No. 294,497 or German Pat. Published Specification No. 2,225/110). These magnetic sensors are composed mainly of a magnetic wire, which is obtained by vapor-depositing or electro-depositing a ferromagnetic thin film, such as permallay, on a conductor. An insulating wire is wound on the magnetic wire to provide a winding and, further, a capacitor is connected in parallel with the winding to provide a resonance circuit of the second harmonic frequency of the exciting current. By the way, the magnetic wire used is usually very thin and the insulating wire to be wound thereon must be thinner than the magnetic wire. Accordingly, winding operation is extremely difficult. If the magnetic wire is distorted by some cause during the operation, magnetization characteristic of the magnetic wire is deteriorated by unavoidable magnet-ostriction, which stops the parametrically excited second harmonic oscillation. Therefore, these magnetic sensors are not well suited for mass production, and hence are expensive.

In this kind of magnetic sensor, there is further a limit in the means for enhancing the directivity characteristic for magnetic detection. Further, the winding operation for each magnetic wire and subsequent wirings are complicated. Consequently, in the magnetic sensor of the above type it is difficult to obtain uniform characteristics.

An object of the present invention is to provide a magnetic sensor free from the above defects and adapted to form respective components as a unitary structure to simplify the configuration, thereby providing for uniform characteristics and enhanced directivity characteristics.

The principle, construction and operations of this invention will be understood from the following detailed description taken in conjunction with the accompanying drawings, in which.

A cylindrical magnetic sensor of this invention can be fabricated by sequentially forming respective components concentrically around a common longitudinal axis of a central conductor by means of photoetching techniques. Of the respective components, coils may be formed as descrived below.

Figure 1A:
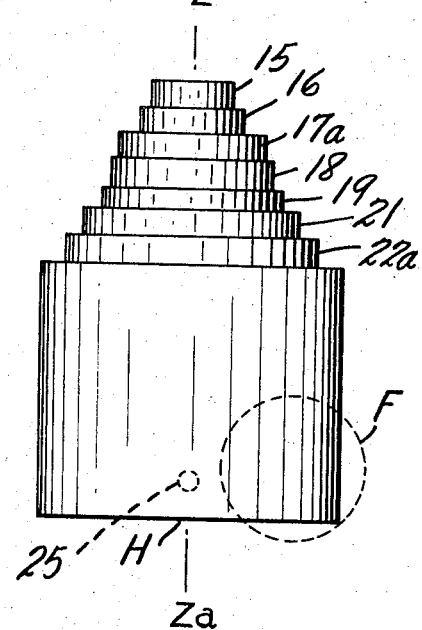
FIG. 1A is a front view of an embodiment of this invention.
Figure 1B:
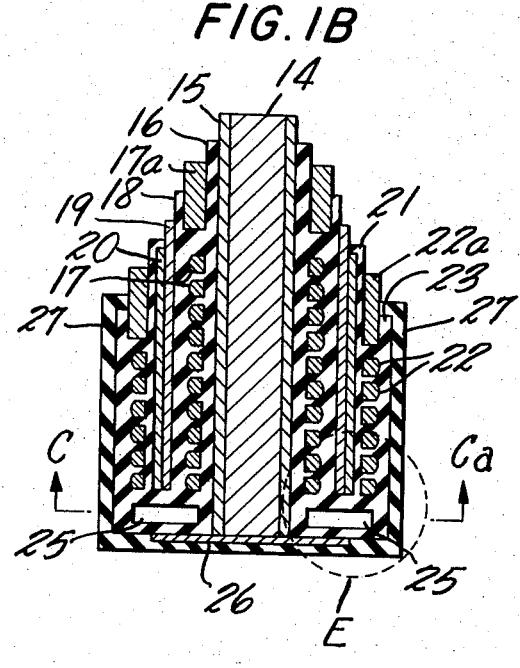
FIG. 1B is a longitudinal cross section along a line Z—Za in FIG. 1A.

In FIG. 1B, a reference numeral 14 indicates a center conductor of good conductivity such as copper, phosphor bronze or beryllium copper. At first, a magnetic thin film 15 is deposited by vapor deposition or electrodeposition on the surface of the center conductor 14. Usually, such a wire and magnetic thin film combination is referred to as a magnetic wire. An insulating thin film 16 is formed by vapor deposition or painting on the surface of the magnetic wire. Then, a conductor layer 17 formed, for example, by the same material as the center conductor 14 is vapor deposited on the insulating thin film 16. A photosensitive material, for example, KPR, is coated on the conductor layer 17 and then the assembly is covered with a mask for forming a coil and then irradiated by light to be thereby sensitized. Those areas of the photosentive material which have been sensitized become hardened and are not dissolved when next treated by a solvent and remain, while those areas which have not been sensitized are dissolved in the solvent and removed. The assembly is then immersed in an etchant to remove portions of the conductor layer which were under the non-sensitized areas, thus providing a coil 17 as shown. A reference numeral 17a designates a part left unremoved to form terminals of the coil 17. An insulating layer 18 of large dielectric constant is formed on the surface of the coil 17 except on the terminals 17 a and a connection hole area 25 described latter on. The layer 18 may be the above-said insulating layer or a sprayed-coating of a magnetic material such, for example, as ferrite, which serves as a flux keeper to capture the magnetic flux leaking outside of the magnetic thin film 15 after a magnetic field, generated by an exciting current flowing in the central conductor 14, has become saturated in the magnetic thin film 15. The coating of such magnetic material is rather effective. A conductor layer 19 is formed on the surface of the insulating layer except for the connection hole area 25. In this case, the layer 19 and the center conductor 14 are connected with each other through a conductor 26 in the part under the connection hole area 25 to flow the exciting current therethrough. A magnetic thin film 20 similar to the aforementioned film 15 is deposited on the surface of the layer 19 except the connection hole area 25. An insulating layer 21 of large dielectric constant is formed on the surface of the magnetic thin film 20 for the connection hole area 25. On the surface of the insulating layer 21, an outer coil 22 is formed by the photoetching techniques employed for the formation of the inner coil 17. A reference numeral 22a represents terminals of the outer coil 22 for external connection. Before forming the coil 22 by etching, the coils 22 and 17 are connected with each other through the connection hole area 25 at the time of vapor depositing of the basic conductor material of the coil. Accordingly, the coils 17 and 22 are differentially connected to cancel the effect from an external uniform magnetic field. A reference numeral 27 identifies a film protecting the sensing portion of the magnetic sensor.

Figure 1C:
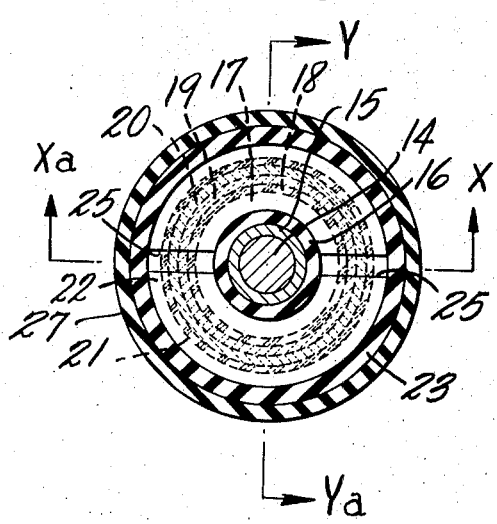
FIG. 1C is a transverse section along a line C—Ca in FIG. 1B.
Figure 1D:
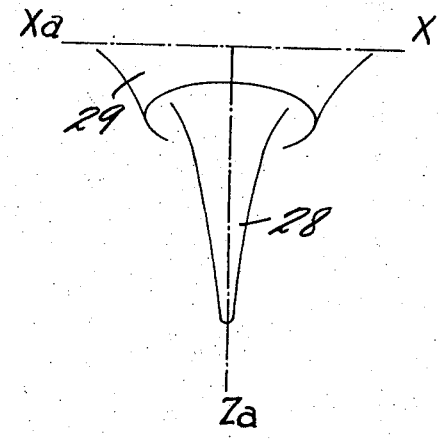
FIG. 1D is a characteristic diagram explanatory of the directivity characteristic of the magnetic sensor illustrated in FIGS. 1A, 1B, 1C and 1D.
Figure 1E:
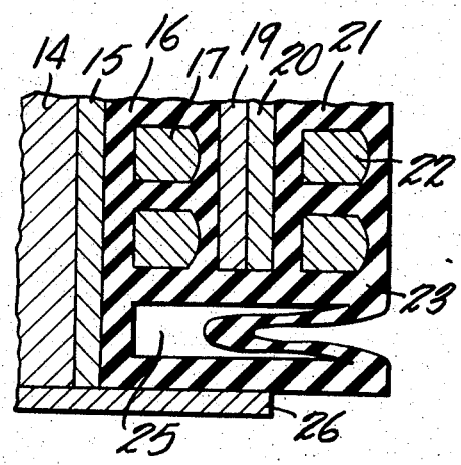
FIGS. 1E and 1F are enlarged longitudinal sections of parts E and F in FIGS. 1A and 1B respectively.

With reference to FIG. 1E, the mutual connection between the coils 17 and 22 will be further described below. After coating the insulating layer 16 on the magnetic thin film 15 deposited on the center conductor 14, the conductor layer 26 is vapor deposited and the coil 17 is formed by photoetching. Then, the insulating layer 18, the conductor layer 19, the magnetic thin film 20 and the insulating layer 21 are sequentially deposited but, in this case, at least one part such as that indicated by the reference 25 in FIG. 1A, that is, the connection hole 25, is masked lest it should be covered with the layers 18, 19, 20 and 21. When the conductor layer 22 (which will form the coil 22 after being etched) is vapor deposited, the mask is removed, so that the coils 17 and 22 are connected with each other at the connection hole area 25.

Figure 1F:
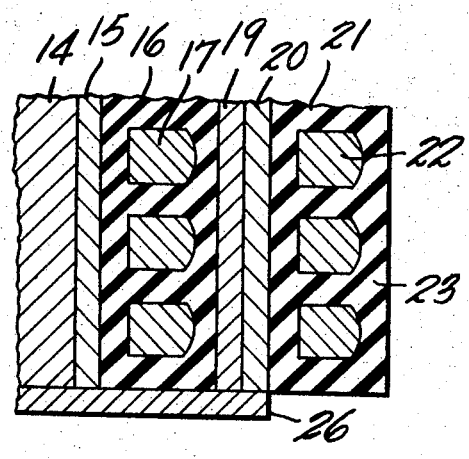

With reference to FIG. 1F, the mutual connection between the center conductor 14 and the conductive layer 19 will be further described. In FIG. 1F, the part from the center conductor 14 to the conductor layer 17 is identical with that in FIG. 1E. The conductor layer 17 is selectively etched away to provide the coil 17, on the surface of which are then deposited the conductor layer 19 and the magnetic thin film 20. Further, after coating the insulating layer 21, the outer coil 22 is formed by the same method as that for the inner coil 17 and insulated with the insulating layer 23. At this time, the conductor film 26 is deposited on the sensing portion of the magnetic sensor to connect the conductors 14 and 19 and to provide a circuit path for an exciting current $i_f$ is flowed here.

In operation, an exciting voltage $e_f$ is applied to the conductors 14 and 19, so that the exciting current $i_f$ flows to magnetize the magnetic thin films 15 and 20. The coils 17 and 22 are connected in series with each other through the connection hole area 25 while the insulating layers 18 and 21 interposed therebetween form a thin layer of a material of large dielectric constant to provide a capacitor using the coils 17 and 22 as electrode plates, so that a resonance circuit formed by connecting a capacitor in parallel with the series connection of the coils 17 and 22 resonates at a frequency twice the exciting frequency $f$ of the exciting current $i_f$, thus providing a parametrically excited second harmonic oscillation element (a magnetic sensor). Of course, it is also possible to construct the parametrically excited second harmonic oscillation element (the magnetic sensor) by connecting a prescribed capacitor between the terminals 17a and 22a. The cross-section of the connection hole 25 taken along the line C—Ca is shown in FIG. 1C. The hole 25 is to connect the coils 17 and 22 with each other and it is, for example, cylindrical as shown in FIG. 1A but need not be limited specifically thereto. A reference character H indicates the sensing portion of this magnetic sensor.

In FIG. 1D showing the directivity characteristic of the magnetic sensor of this invention for magnetic detection, a reference numeral 28 designates a main beam dependent upon the diameter of the center magnetic wire 14 and 29 a side lobe.

Figure 2:
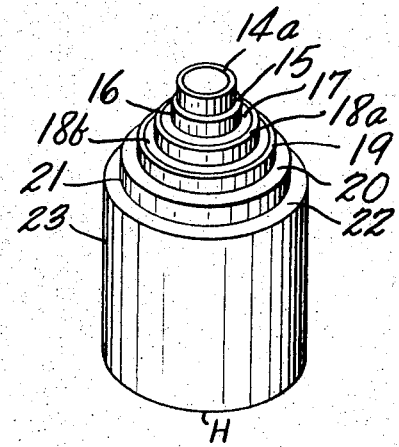
FIG. 2 is a perspective view illustrating another embodiment of this invention.

FIG. 2 illustrates another example of this invention, which employs a cylindrical center conductor 14a. Parts corresponding to those in FIGS. 1A to 1F are identified by the same reference numerals. The coils 17 and 22 may be windings formed with usual wires. An insulator 18b such as resin or the like is interposed between the coil 17 and the conductor 19. Since the other construction and the operation are the same as those of the example of FIGS. 1A to 1F, no detailed description will be given.

As has been described in the foregoing, the magnetic sensor of this invention is capable of utilizing the photoetching techniques in the manufacture thereof, so that its elements can be mass produced and fabricated extremely small and precisely. As a result, the main magnetic wires and the auxiliary magnetic wires of the sensor can be disposed sufficiently close to each other and the coils can be produced with accuracy. Thus, it is possible to obtain a magnetic sensor having an extremely sharp directivity characteristic as compared with the conventional magnetic sensors and provide elements of uniform characteristics.

What we claim is:

1. A magnetic sensor of the parametrically excited second harmonic oscillator type comprising:
    a. a conductor having a straight portion having a central longitudinal axis, said conductor having a magnetic thin film disposed on a surface of said straight portion;
    b. a pair of coils comprising an inner coil and an outer coil disposed coaxially with said central longitudinal axis and extending longitudinally of said conductor over a common portion of said straight portion of said conductor;
    c. means electrically connecting said pair of coils in series;
    d. a hollow cylindrical conductor having a magnetic thin film disposed on an outer surface thereof, said cylindrical conductor being disposed between said inner coil and said outer coil and coaxially with said central longitudinal axis and extending longitudinally of said straight portion of said conductor over a portion common with said coils; and
    e. means electrically connecting said conductor with said cylindrical conductor to define a series input circuit, said input circuit receptive in operation of an exciting current for developing oscillations in said pair of coils, said oscillations having a phase determined by a sensed external magnetic field.

2. A magnetic sensor according to claim 1, wherein said two coils each comprise a thin film of conductive material disposed on said straight portion of said conductor in a helical path and on said magnetic thin film disposed on said cylindrical conductor in a helical path.

3. A magnetic sensor according to claim 1, wherein said straight portion of said conductor is another cylindrical conductor.

4. A magnetic sensor according to claim 1, wherein said means electrically connecting said pair of coils in series are means connecting said pair of coils in a differential series connection to cancel effects of uniform external magnetic fields.

5. A magnetic sensor according to claim 1 further comprising a cylindrical layer of dielectric material disposed between said inner coil and said cylindrical conductor.

6. A magnetic sensor according to claim 1 further comprising a cylindrical layer of dielectric material adjacent said inner coil and a second cylindrical layer of dielectric material adjacent said outer coil.

* * * * *